United States Patent
Kreutz

(10) Patent No.: US 10,933,901 B2
(45) Date of Patent: Mar. 2, 2021

(54) CONTROL YOKE FOR STEERING A MOTOR VEHICLE

(71) Applicants: THYSSENKRUPP PRESTA AG, Eschen (LI); thyssenkrupp AG, Essen (DE)

(72) Inventor: Daniel Kreutz, Feldkirch (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 159 days.

(21) Appl. No.: 16/325,607

(22) PCT Filed: Aug. 16, 2017

(86) PCT No.: PCT/EP2017/070757
§ 371 (c)(1),
(2) Date: Feb. 14, 2019

(87) PCT Pub. No.: WO2018/033569
PCT Pub. Date: Feb. 22, 2018

(65) Prior Publication Data
US 2019/0176868 A1    Jun. 13, 2019

(30) Foreign Application Priority Data
Aug. 19, 2016 (DE) ..................... 10 2016 115 466.0

(51) Int. Cl.
*B62D 1/181* (2006.01)
*B62D 1/06* (2006.01)
(Continued)

(52) U.S. Cl.
CPC ................. *B62D 1/06* (2013.01); *B62D 1/04* (2013.01); *B62D 1/08* (2013.01); *B60R 2011/0085* (2013.01)

(58) Field of Classification Search
CPC .... B62D 1/04; B62D 1/06; B62D 1/08; B60R 2011/0085
(Continued)

(56) References Cited

U.S. PATENT DOCUMENTS 7,004,048 B2 * 2/2006 Kobayashi ............... B62D 1/04
74/552
7,806,224 B2 * 10/2010 Maeda .................... B62D 1/181
180/334

(Continued)

FOREIGN PATENT DOCUMENTS

CN         1422776 A      6/2003
CN       201045046 Y      4/2008
(Continued)

OTHER PUBLICATIONS

International Search Report issued in PCT/EP2017/070757, dated Oct. 24, 2017.

*Primary Examiner* — Toan C To
(74) *Attorney, Agent, or Firm* — thyssenkrupp North America, LLC

(57) ABSTRACT

A control yoke for steering a motor vehicle, with a hub attached to a steering shaft, is connected to two steering handles protruding laterally in opposite directions, and has a motor-driven adjustment device by means of which the steering handles are displaceable from a usage position at a greater distance from the hub into a standby position at a smaller distance from the hub and vice versa. In an automatic steering mode of the motor vehicle the steering handles are rotatable by means of the adjustment device towards the driver in the usage position and away from the driver in the standby position about a transverse axis which connects the two steering handles and is arranged transversely to the rotation axis of the steering shaft.

17 Claims, 3 Drawing Sheets

(51) Int. Cl.
*B62D 1/08* (2006.01)
*B62D 1/04* (2006.01)
*B60R 11/00* (2006.01)

(58) Field of Classification Search
USPC .................................. 280/778; 74/492, 493
See application file for complete search history.

(56) References Cited

U.S. PATENT DOCUMENTS

| | | | | |
|---|---|---|---|---|
| 8,473,160 | B2* | 6/2013 | Kuramori | B62D 6/10 |
| | | | | 701/41 |
| 8,960,043 | B2* | 2/2015 | Kimura | B62D 1/14 |
| | | | | 74/492 |
| 2007/0221007 | A1* | 9/2007 | Ozaki | B62D 5/006 |
| | | | | 74/484 R |
| 2009/0064815 | A1* | 3/2009 | Maeda | B62D 1/183 |
| | | | | 74/493 |
| 2013/0014604 | A1 | 1/2013 | Kimura | |
| 2015/0061264 | A1* | 3/2015 | Pohanka | B62D 1/06 |
| | | | | 280/728.2 |
| 2018/0148083 | A1* | 5/2018 | Kuramochi | B60Q 1/343 |

FOREIGN PATENT DOCUMENTS

| | | |
|---|---|---|
| CN | 102822033 A | 12/2012 |
| DE | 102 48 487 A | 5/2003 |
| DE | 10 2006 006 995 B | 8/2007 |
| EP | 2 033 874 A | 3/2009 |
| ES | 2 351 636 A | 2/2011 |
| FR | 2 861 657 A | 5/2005 |
| JP | 2012-171444 A | 9/2012 |
| WO | 2009/098559 A | 8/2009 |

\* cited by examiner

CONTROL YOKE FOR STEERING A MOTOR VEHICLE

CROSS REFERENCE TO RELATED APPLICATIONS

This application is a U.S. National Stage Entry of International Patent Application Serial Number PCT/EP2017/070757, filed Aug. 16, 2017, which claims priority to German Patent Application No. DE 10 2016 115 466.0, filed Aug. 19, 2016, the entire contents of both of which are incorporated herein by reference.

FIELD OF THE INVENTIONS

The present disclosure generally relates to a control yoke for steering a motor vehicle.

BACKGROUND OF THE INVENTIONS AND DESCRIPTION OF RELATED ART

In motor vehicles in which an automated driving mode is possible without the driver needing to make a steering input via a steering input means, there is a risk that the driver will accidentally touch the steering wheel and hence execute an undesirable driving movement. Also, a steering wheel takes up space unnecessarily. Conventional steering wheels consist of a round, closed steering wheel rim which is connected to the steering wheel hub via fixed webs. The lower region of the steering wheel rim may have a flattened region, for example in sporting vehicles, in order to give the driver more legroom. As a whole, conventional steering wheels are however rigid and unchangeable in shape. Usually, only the position is changeable by adjusting the reach and height. Also, there are steering wheels which can be tipped upward to give the driver easier access.

In future vehicles, the degree of automation will rise greatly without the driver being included in the vehicle control circuit. In this context, reference is made to SAE4 Level automation according to VDA. In such vehicles, in automatic driving mode, the steering wheel will be perceived as disruptive since the driver cannot use, or can only use with restrictions, the space in front of him. Since conventional steering wheels have a large diameter, they cannot easily be removed from the immediate vicinity of the driver.

FR 2 861 657 A1 discloses a type of size-adjustable control yoke in which lateral handles can be brought into an extended or a retracted position by means of a rack and pinion connection and a motor. In the fully retracted state, the steering wheel can no longer be actuated. This has the disadvantage that the driver cannot intervene for correction in the event of an emergency.

Thus a need exists for a control yoke for steering a motor vehicle of the type cited initially which has a simple construction and can be actuated manually in an emergency. The invention achieves this object in that the steering handles can be rotated by means of the adjustment device towards the driver in the usage position and away from the driver in the standby position, about a transverse axis which connects the two steering handles and is arranged transversely to the rotation axis of the steering shaft. Due to the additional rotational movement away from the driver, the steering handles can be removed from the driver's area and at the same time retracted through a defined distance. The adjustment device allows adjustment travels from the usage position into the standby position of between 30 and 40 mm along the transverse axis. By the rotational movement around the rotation axis, in the retracted state the control yoke is not only more compact but gives the driver additional space, while at the same time it remains in a standby position which allows intervention by the driver at any time. The driver may continue to actuate the steering handles even when they are arranged close to the hub and are tipped away from him in the direction of the vehicle front. The translational movement from the usage position to the standby position and vice versa may be carried out before the rotational movement, or the other way round. Furthermore, it is preferred to carry out a coupled movement of translation and rotation of the steering handles.

DETAILED DESCRIPTION OF THE INVENTIONS

Figure 1:
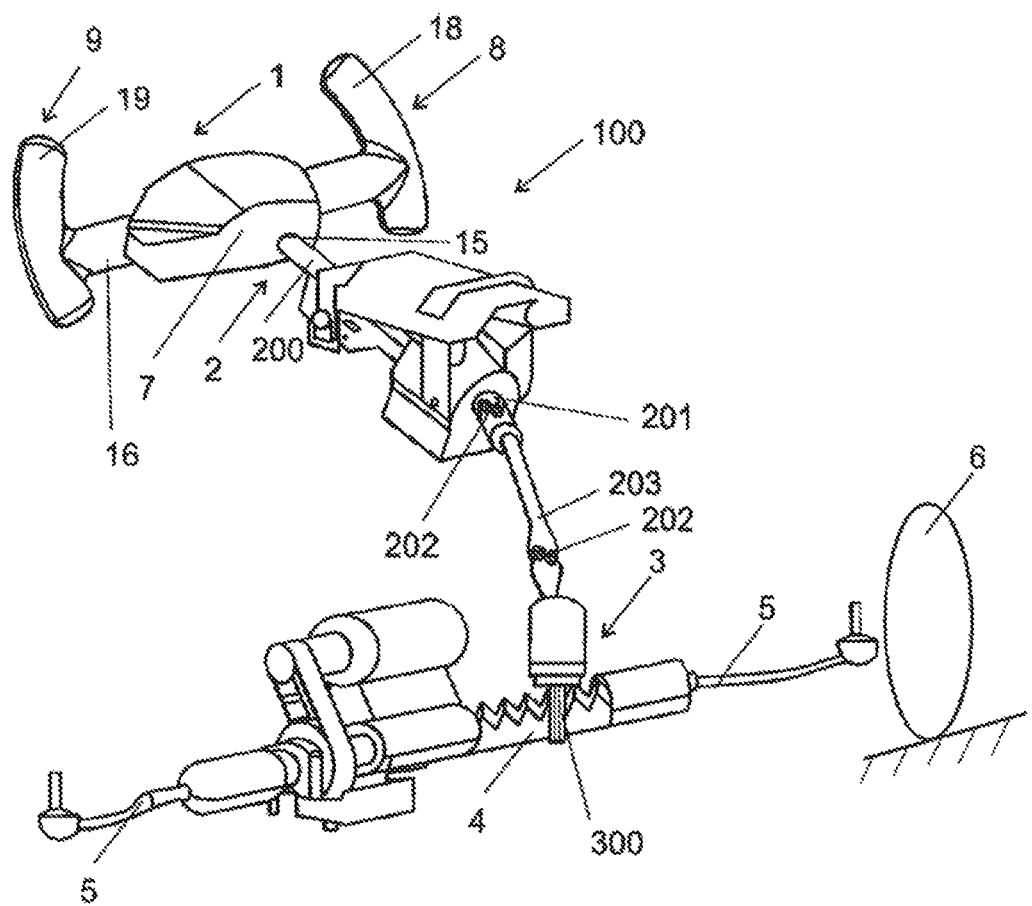
FIG. 1 is a diagram of a steering device for motor vehicles.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention concerns a control yoke for steering a motor vehicle, with a hub which is attached to a steering shaft, is connected to two steering handles protruding laterally in opposite directions, and has a motor-driven adjustment device by means of which the steering handles are displaceable from a usage position at a greater distance from the hub into a standby position at a smaller distance from the hub and vice versa.

The hub comprises a fixing opening. The hub may be received in a hub part. An airbag may be integrated in the hub part. Further operating or comfort controls may be provided on the hub part, such as for example a vehicle horn, a flasher device or a control device for vehicle lighting. In one embodiment of the invention, it is provided that the steering handles each have a connecting portion which runs in the direction of said transverse axis and is connected to the hub, and is connected to a radially outwardly arranged handle part which, in the usage position of the control yoke, extends upward inside a plane orthogonal to the rotation axis of the steering shaft and, in the standby position of the control yoke, extends towards the vehicle front. In the usage position of the control yoke, the handle part can therefore easily be gripped by the driver, but in the standby position of the control yoke it can still be gripped and actuated in an emergency so as to avoid hazardous situations better. The respective connecting portions connect the handle parts to the adjustment device which acts on the connecting portions.

In a preferred embodiment, the steering handles may be twisted by means of the adjustment device between the usage position and the standby position through a twist angle of between 45° and 90° relative to the rotation axis of the steering shaft. It is also conceivable and possible to set a twist angle of the steering handles which is smaller than 45° relative to the rotation axis of the steering shaft. Furthermore, the twist angle may be greater than 90°. The rotational movement of the control yoke allows the driver to turn the steering handles into a usage position which is optimal for him. In the usage position, the steering handles therefore point obliquely upward away from the driver in a direction which is familiar to the driver from conventional steering wheels and which allows a comfortable grip. Or in other words, the twist angle relative to the rotation axis of the steering shaft is smaller and tends towards 0°. In the standby position, the steering handles point obliquely forward, approximately parallel to the rotation axis of the steering shaft and in the direction of the driver, i.e. the twist angle relative to the rotation axis of the steering shaft is greater and may amount to between 25° and 80°. The angular setting relative to the usage position and standby positions may also be set conversely and transferred to the respective other position. In an emergency, the driver grips the steering handles and can safely actuate the steering.

The position of the adjustment device is detected via a sensor, such as for example a Hall effect sensor or a magneto-resistive sensor.

In a preferred embodiment of the invention, the adjustment device has a guide tube which is connected rotationally fixedly to the steering shaft and is oriented along said transverse axis. The connecting portion of the steering handles may be attached to the guide tube so that the steering handles can be brought from the standby position into the usage position and vice versa along the transverse axis. In this way, the translational movement may be achieved with few components.

Preferably, each connecting portion of the steering handles comprises a connecting tube which is guided so as to be displaceable relative to the guide tube. Such a tube-in-tube connection is particularly simple and stable. In a particularly preferred embodiment of the invention, the respective connecting tube and the respective connecting portion are formed of one piece. Here, therefore, the respective connecting tube serves as the connecting portion for the handle part of the respective steering handle.

According to a further advantageous embodiment, the respective connecting tube is displaceable relative to the guide tube by means of a spindle drive driven by an electric motor. The electric motor may be arranged on the spindle or be connected to the spindle via a spindle drive parallel to the spindle. Spindle drives are simple in structure, can generate large displacement forces and are automatically blocked by self-locking when the motor is switched off. It is conceivable and possible to arrange a spindle with a nut on each spindle end and provide the spindle with a left-hand thread on one spindle end and with a right-hand thread on the other spindle end.

Preferably, a tube guide for the guide tube is provided in the hub part. The tube guide may contain a movement-limiting element or a stop element so that the adjustment device can only be moved into the retracted or extended position within a defined travel distance.

In a further advantageous embodiment of the invention, a single electric motor may be provided with two spindle drives for displacing both connecting tubes. This measure may save one electric motor. In a further embodiment, it is provided that the electric motor is arranged in the guide tube, that a spindle is arranged on both axial sides of the motor shaft and is oriented in the direction of the associated connecting tube, and that nuts sitting on the spindles are each connected to the associated connecting tube directly or indirectly via further elements, wherein a first spindle and its associated first nut have a right-hand thread and a second spindle and its associated second nut have a left-hand thread. With this measure, both nuts on the respective spindles move simultaneously radially inwardly or radially outwardly depending on the rotation direction of the electric motor.

Preferably, two electric motors are provided with two spindle drives for displacing the respective connecting tubes. For this, standard components with relatively small dimensions may be used.

In a further embodiment, the two electric motors of the spindle drives are arranged in the guide tube, wherein spindles arranged on the motor shafts are each oriented in the direction of the associated connecting tube, and the nuts sitting on the spindles are each connected to the associated connecting tube directly or indirectly via further elements. When the electric motors are actuated, the respective nut on the rotating spindle travels radially inwardly towards the hub part or radially outwardly away from the hub part, and carries with it the respective connecting tube and hence the respective steering handle in the same direction.

Preferably also, the two electric motors of the spindle drives are each arranged in the connecting tube, wherein the spindles arranged on the motor shafts are each oriented in the direction of the guide tube, and the nuts sitting on the spindles are connected to the guide tube. In this embodiment, actuation of the electric motors has the effect that the rotating spindles screw into the fixed nuts of the guide tube and hence move the respective electric motor and the steering handle connected to the electric motor towards the hub part or, for the reverse direction of rotation of the electric motor, away from the hub part.

In order to ensure that the steering handles can be twisted, the connecting tubes are each mounted via a bearing so as to be rotatable about said transverse axis. Preferably, a plain bearing is used as a bearing and is arranged between the connecting portion and the connecting tube. This design is particularly compact and simple to produce.

In order to achieve the twist function of the connecting tubes and/or the connecting portions of the steering handle with as little complexity as possible, a refinement of the invention proposes that the connecting tubes and/or the guide tube and/or the steering handle each have at least one recess provided in one portion, into each of which a radially outwardly protruding bolt engages which is attached to the housing element or sits on a housing protrusion of the associated electric motor which connects the motor shaft and threaded spindle together via ball-bearings. The recess may be formed as a curved track. Said recess constitutes a sliding block guide which causes a connecting tube or a connecting portion of the steering handle, which is displaced in the direction of said transverse axis by means of spindle drive, to be force-twisted because of the bolt extending into the recess. Therefore the axial displacement at the same time achieves a twist about said transverse axis. Or in other words, there is a coupled translational and rotational movement along the curved track, wherein the steering handles are moved towards the inside or outside along the transverse axis and at the same time turned towards or away from the driver around the rotational axis. Also, said bolt at the same time connects the electric motor with its spindle drive to the steering handles, for example via the guide tube and/or via the connecting tube.

It is conceivable and possible to provide a rectilinear, spiral or helical recess. Furthermore, several recesses running in the same direction may be provided, in which several bolts are engaged.

In an alternative embodiment with the same kinetic effect, it is provided that two end portions of the guide tube are each provided with at least one helical recess in at least one portion, into which recess a radially inwardly protruding bolt engages which is fixed to the respective connecting tube. In this embodiment, the arrangement of the helical recess and the bolt on the respective connecting tube or guide tube is simply reversed. In the latter design also, alternatively more than one recess of the same shape and more than one bolt may be provided on each side. It is furthermore conceivable and possible to provide a bolt head on both sides of the bolt shank. The bolt may be made of plastic.

Both the latter designs allow the respective connecting tube and with it the respective steering handle to be clamped to the hub part both in the extended usage position and in the retracted standby position. The respective spindle drive ensures that the clamping cannot loosen independently. The clamping achieves a play-free connection between steering handles and the hub part in both the usage position and in standby position, so that in both positions a secure and play-free actuation of the steering is possible.

The invention is further improved by the measure that each recess of the respective connecting tube or, depending on variant, each recess of the guide tube has axially oriented end portions at each end of its helical portion. This measure ensures that even under the action of greater force on the steering handles, a twist in the direction of said transverse axis is prevented if the respective bolt lies in the respective axially oriented end portion. Twisting of the steering handle concerned is then blocked. A separate blocking device to secure the steering handles in the two end positions is therefore advantageously superfluous, because blocking is guaranteed here with minimum complexity. Preferably, the recess has a slip coating or damper to damp the movement of the bolt. This may also be provided only in the end regions of the recess. It is also conceivable and possible that the bolt has a damping element or damping layer formed on the bolt head and/or the bolt shank in order to extend the life of the adjustment device.

The invention thus ensures several functions—namely the axial retraction and extension of two steering handles, the rotation of two steering handles out of the driver's area, and the blocking of the two steering handles in the respective end positions of the standby position and the usage position—by construction details which can be produced simply and at low cost, by means of one or two electric motors, one or two spindle drives and two recesses in the form of curved tracks with axially oriented end portions. Furthermore, the clamping of the connecting tubes in the respective end positions by means of the self-locking spindle drives ensures play-free fixing of the steering handles to the hub part. A further advantage of this measure is that a play between the components, in particular between the connecting tubes and the guide tube, can be tolerated during the adjustment process. This in turn has the advantage that the corresponding components can be produced with large tolerances and hence substantially more cheaply.

Although in the example here, an electromechanical power steering mechanism is shown with mechanical coupling between the control yoke and steering pinion, the invention may preferably also be used for motor vehicle steering systems in which there is no mechanical coupling. Such steering systems are known as steer-by-wire.

FIG. 1 shows a motor vehicle steering system 100, wherein a driver applies a steering moment as a steering command onto a steering shaft 2 via a control yoke 1. The steering moment is transmitted via the steering shaft 2 to a steering pinion 40 which meshes with a toothed rack 4. The toothed rack 4 transmits a displacement of the track rods 5 to the steerable vehicle wheels 6. The steering shaft 2 on the input side has an input shaft 200 connected to the control yoke 1, and on the output side an output shaft 201 connected to the toothed rack 4 via the steering pinion 40. The input shaft 200 and the output shaft 201 are connected together rotationally elastically via a torsion bar, not shown in FIG. 1. A torque transferred by the driver to the input shaft 200 via the control yoke leads to a twist of the input shaft 200 relative to the output shaft 201. This relative twist between the input shaft 200 and the output shaft 201 may be determined via a twist angle sensor.

The steering shaft 2 according to FIG. 1 furthermore comprises one or more universal joints 202, by means of which the course of the steering shaft 2 in the motor vehicle may be adapted to the physical circumstances. An intermediate steering shaft 203 of the steering shaft 2, which in the example shown is arranged between two universal joints 202 and connects the output shaft 201 to the steering pinion 300 of the steering gear 3, is configured according to the invention as an adjustable length steering shaft 203.

Figure 2:
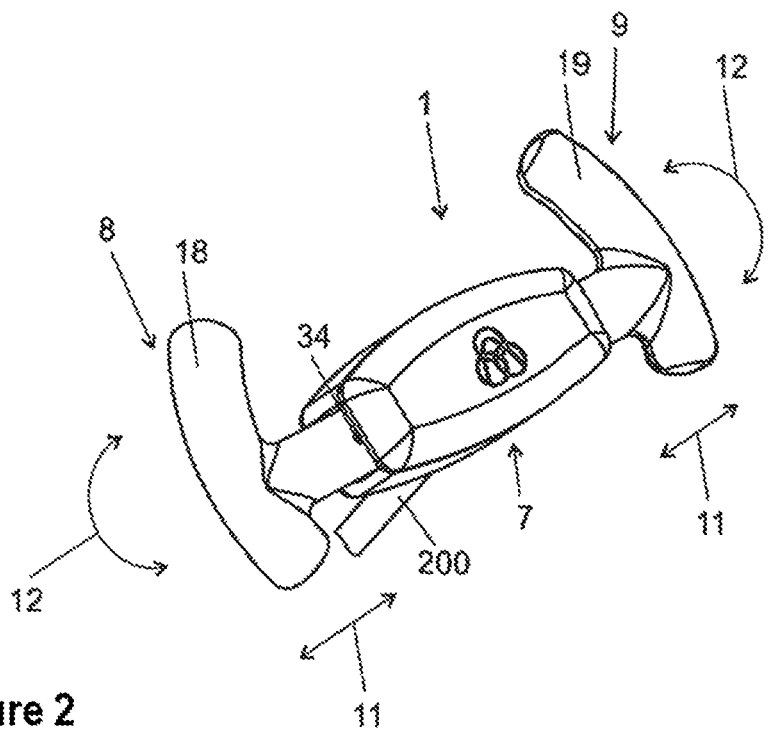
FIG. 2 is a perspective view a control yoke.

The control yoke 1 according to the invention, as shown in FIG. 2, has a hub part 7 and two steering handles 8, 9 which are arranged on the side of the hub part 7 and are displaceable in the arrow direction 11 along a transverse axis 10 connecting the two steering handles 8, 9. In a usage position, the two steering handles 8, 9 are each in an extended state and are arranged at a distance comfortable for the driver, such as for example the greatest possible distance from the hub part 7. The steering handles 8, 9 are in this usage position when the driver steers the motor vehicle manually by means of the control yoke 1 and for this grips the steering handles 8, 9. When the motor vehicle is driven and steered fully automatically by means of an on-board computer without any steering input from the driver, it is not necessary for the driver to be able to intervene manually. In this case, the steering handles 8, 9 in the usage position constitute an obstacle. Therefore a standby position of the steering handles 8, 9 is provided, in which these are displaced in the arrow direction 11 towards each other until close to the hub part 7 and thus retracted. At the same time, the steering handles 8, 9 are twisted in the rotation direction 12 away from the driver towards the front of the motor vehicle. In this standby position, the motor vehicle is driven substantially without intervention by the driver. In an emergency however, the latter can still grip the steering handles 8, 9 in the standby position and perform manual steering inputs.

Figure 3:
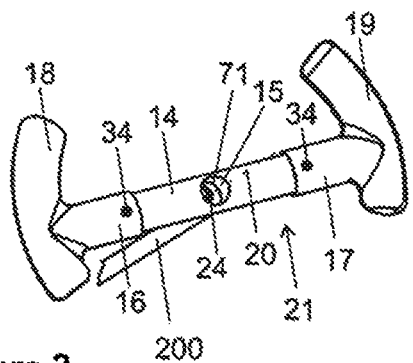
FIG. 3 is a perspective view of an alternative control.

FIG. 3 shows a control yoke 1 with a hub 71. This hub 71 comprises a fixing opening 15 via which the control yoke 1 is connected to the input shaft 200. Via one or more adjustment motors 24, the connecting portions 16, 17 of the steering handles 8, 9 can be brought via the motor-driven adjustment device 21 from the standby position into the usage position and vice versa.

Figure 6:
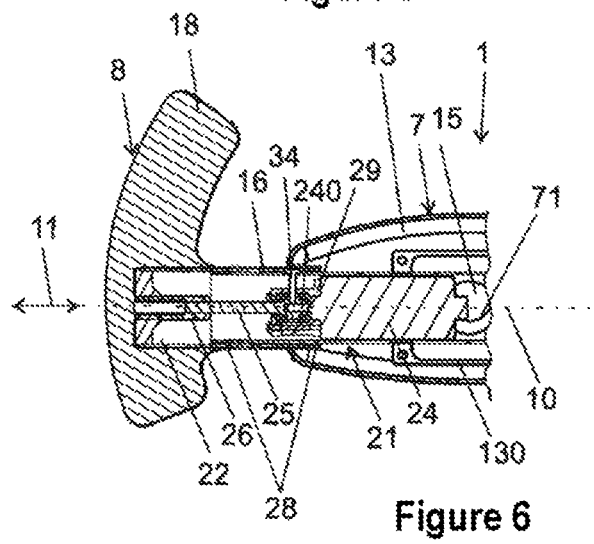
FIG. 6 is a partial sectional view of a control yoke from FIG. 2.
Figure 5:
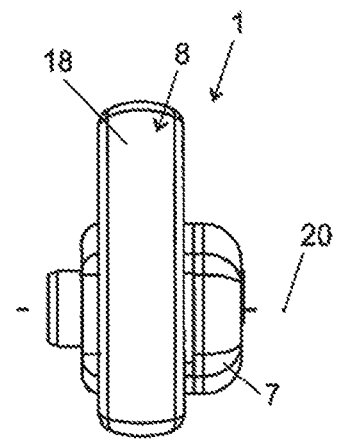
FIG. 5 is a side view of the control yoke from FIG. 2.
Figure 4:
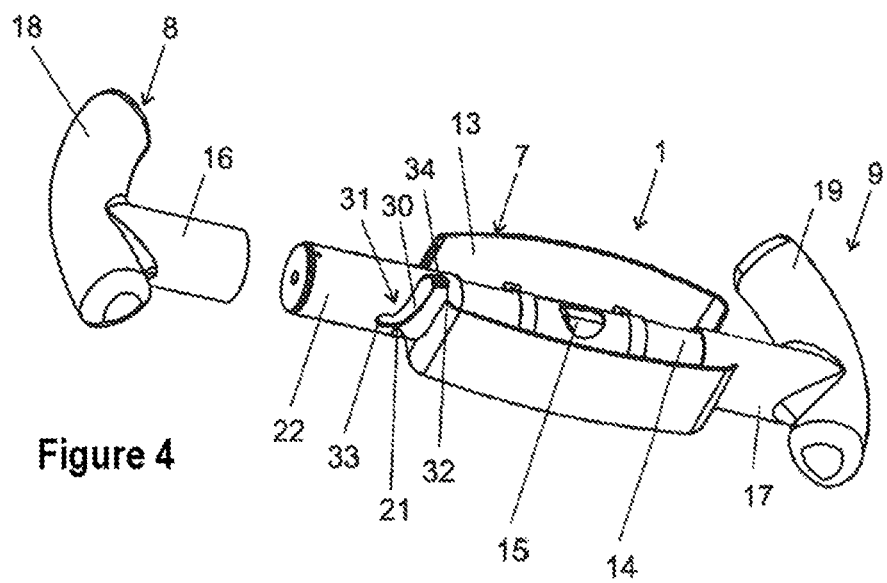
FIG. 4 is a partially dismantled view of the control yoke from FIG. 2.

As evident from FIGS. 4 and 6, the hub 71 comprises the hub part 7 consisting of a cover 13, inside which a guide tube 14 is arranged and oriented longitudinally to the transverse axis 10. The guide tube 14 has a fixing opening 15 for fixing the control yoke 1 on the steering shaft 2. The steering handles 8, 9 each have a connecting portion 16, 17 which serves to connect the steering handle 8, 9 to the hub part 7, and a grip part 18, 19 which, in the usage position of the control yoke 1, extends upward inside a plane orthogonal to the rotation axis 20 of the steering shaft 2 (FIG. 5), and in the standby position of the control yoke 1, extends towards the vehicle front. Said plane, orthogonal to the rotation axis 20 of the steering shaft 2, is the plane of the paper in FIG. 6. The steering handles 8, 9 are here twisted in the rotation direction 12 through an angle between 45° and around 90° and displaced in the axial direction or arrow direction 11 through a distance of around 30 to 40 mm.

An adjustment device 21 serves to adjust the steering handles 8, 9 between the usage position and the standby position. The adjustment device 21 comprises the guide tube 14, which is connected rotationally fixedly to the steering shaft 2 and is oriented along the transverse axis 10, and a connecting tube 22 which can be displaced in the arrow direction 11 relative to the guide tube 14 and is arranged so as to be rotatable in the rotation direction 12. The sectional depiction shown partially in FIG. 6 shows the adjustment device 21 of a steering handle 8. The adjustment device 21 of the second steering handle 9 is arranged axially symmetrically to the first steering handle 8 and is provided with the same components. For this, the connecting tube 22 is pushed onto the guide tube 14. In FIGS. 4 and 6, the first or left connecting tube 22 is received in the left connecting portion 16 of the left steering handle 8. The steering handle 8 shown on the left side of FIG. 4, 6 or 7 has a separate connecting portion 16 which is pushed onto the connecting tube 22 and fixedly connected thereto. The connecting portion 16 and the connecting tube 22 are mounted so as to be rotatable about the transverse axis 10. The plain bearings 28 are arranged spaced apart from each other.

Figure 7:
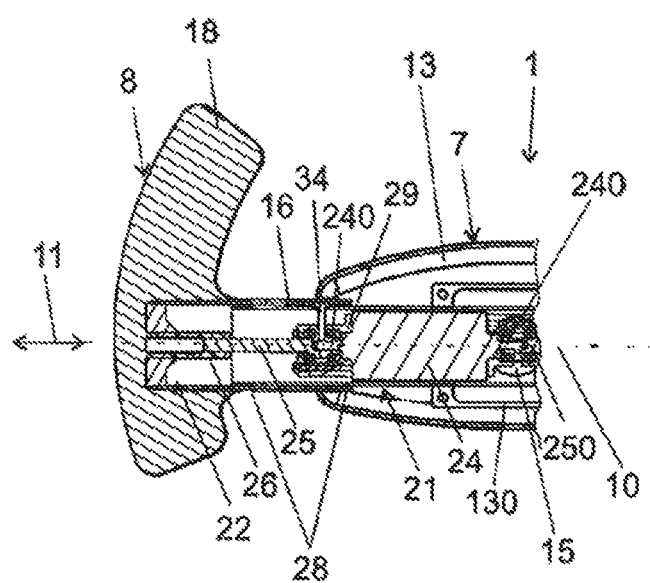
FIG. 7 is another partial sectional view of a control yoke with two threaded spindles on an electric motor from FIG. 6.

FIGS. 6 and 7 show an electric motor 24 which serves to actuate the adjustment device 21. A motor shaft 240 of the electric motor 24, oriented in the direction of the transverse axis 10, is provided with a spindle 25 which cooperates with a nut 26 arranged rotationally fixedly on the connecting tube 22. A double ball-bearing mounts the spindle 25 and the motor shaft 240. A housing element 29 connects the motor shaft 240 and the threaded spindle 25 together via the ball-bearing. When the motor turns in one rotation direction, so that the spindle 25 is screwed into the nut 26, the nut together with the connecting tube 22, the connecting portion 26 and the handle part 18 connected thereto is moved both in the arrow direction 11 and in the rotation direction 12 towards the hub part 7, so that the adjustment device 21 is brought into the standby position. Thus a coupled translational and rotational movement of the connecting portion takes place, in which the steering handle 8 is twisted towards the driver and the connecting portion is retracted in the direction of a housing portion 130 or a cover 13 of the hub part 7. When the electric motor 24 turns in the opposite direction, from the standby position to the usage position, the spindle 25 unscrews from the nut 26, so that the nut 26 together with the connecting tube 22, the connecting portion 16 arranged thereon and handle part 18 moves in the arrow direction 11 towards the outside away from the housing portion 130 or the hub part 7 and is twisted away from the driver in the rotation direction. The displacement works similarly for the second steering handle 9.

To drive the respective spindle 25 in the nut 26, either an electric motor 24 may be provided in each case, wherein the spindle (not shown) of the second electric motor (not shown) must protrude in the arrow direction 11 axially symmetrically in the opposite direction, while the spindle 25 (shown) of the electric motor 24 (shown) protrudes to the left in the arrow direction 11. The two electric motors 24 are here advantageously arranged compactly inside the guide tube 14 or parallel thereto via a V-belt drive.

As shown in FIG. 7, a single electric motor 24 may also be provided with two spindle drives 25, 26, 250 for displacing the two connecting tubes 22 or the connecting portions 16, 17 and hence the two steering handles 8, 9. In this embodiment, the single electric motor 24 may be arranged in the guide tube 14, its motor shaft 240 must however extend out of the motor housing on both axial sides and carry a spindle 25, 250 on both sides, wherein the two spindles point in opposite directions and are oriented along said transverse axis 10. The two spindles each protrude into a nut which in turn is connected directly or indirectly to the associated connecting tube 22. It must however be ensured that a first spindle 25 and its associated first nut 26 have a right-hand thread, and a second spindle 250 and its associated second nut have a left-hand thread. Only with this arrangement is it guaranteed that a rotation of the motor shaft of the electric motor 24 in one rotation direction moves both nuts simultaneously outwardly, or simultaneously inwardly when rotated in the opposite direction.

For technical implementation of the twist of the two steering handles 8, 9 in rotation direction 12, the connecting tubes 22 are each mounted via a bearing 28 so as to be rotatable about said transverse axis 10. FIG. 6 shows the plain bearing 28, which is here configured as a double plain bearing.

As shown in FIG. 4, the connecting tube 22 has a helical recess 31, delimited by two end portions 32, 33, in a portion 30 arranged adjacent to the cover 13 of the hub part 7. The curved track of the recess 31 describes an S-shaped path. A bolt 34, which is attached to the guide tube 14 and protrudes radially outwardly starting from the guide tube 14, engages in the recess. The bolt 34 simultaneously also connects the connecting tube 14 to the respective guide tube 22. The two axially oriented end portions 32, 33 of the recess 31 start from the middle portion 30 or transform into the middle portion 30. If the connecting tube 22 is brought into the usage position shown in FIG. 4 by means of the spindle drive 25, 26, the bolt 34 is stopped in the inner end portion 32. Since the inner end portion 32 is oriented axially, i.e. runs in the direction of the transverse axis 10, albeit only to a very short extent, the connecting tube 22 is locked against twisting in the rotation direction 12. The bolt 34 lies with preload on the end of the end portion 32 shown at the top right in FIG. 4, and thus clamps the connecting tube 22 to the guide tube 14.

If the recess 31 or the bolt 34 has a play due to low-cost and less dimensionally precise production, this is perceived only during the process of adjustment and twisting out of the usage position into the standby position or vice versa.

Because of the clamping described above, the play no longer has an effect in the respective end position (usage position or standby position).

Similarly, when the steering handle 8 is moved maximally towards the inside in arrow direction 11, the bolt 34 lies at the end of the lower end portion 33 pointing to the left, and clamps the connecting tube 22 to the guide tube 14 again. This has the same positive effects as described above.

The rectilinear middle portion 30 of the recess 31 allows the connecting tube 22, on a displacement in the arrow direction 11 by means of spindle drive 25, 26, at the same time to be twisted in the rotation direction 12 about a defined angle, so that the handle part 18 of the steering handle 8 is twisted in rotation direction 12 away from the driver and towards the vehicle front. This rotational movement is achieved purely by the shape of the recess 31 and requires no further twisting device, in particular no further electric motor.

The displacement in arrow direction 11 and the twist in rotation direction 12 takes place similarly for the other steering handle 9. Here again, in the connecting tube 23 which is identical to the connecting portion 17, a recess (not shown) is provided which has a central helical portion 30 and two axial end portions 32, 33 running in the direction of the transverse axis 10. A bolt (not shown) is also attached to the guide tube 14 and protrudes radially outwardly from the guide tube 14 into the recess (not shown) of the connecting tube 22 or connecting portion 17.

In an embodiment not shown, the guide tube 14 is provided with a recess having a helical portion in each end region, into which recess a bolt attached to the respective connecting tube 22 engages radially inwardly.

The invention thus guarantees, by simple structural measures, a secure adjustment of the steering handles 8, 9 of the control yoke 1 according to the invention from a usage position into a standby position or vice versa, wherein as well as an axial displacement in the arrow direction 11, at the same time a rotation of the steering handles 8, 9 in rotation direction 12 is achieved; also, without the need for special blocking devices, a play-free locking of the steering handles 8, 9 in the respective end positions of the usage position and standby position is guaranteed. The structural complexity and the associated production costs are advantageously low.

What is claimed is:

1. A control yoke for steering a motor vehicle, comprising:
    a hub;
    a steering shaft attached to the hub;
    two steering handles protruding laterally in opposite directions from the hub; and
    a motor-driven adjustment device configured to displace the steering handles from a usage position at a greater distance from the hub into a standby position at a smaller distance from the hub and vice versa;
    wherein the steering handles are configured to rotate by means of the adjustment device towards the driver in the usage position and away from the driver in the standby position about a transverse axis which connects the two steering handles and is arranged transversely to the rotation axis of the steering shaft.

2. The control yoke of claim 1, wherein the steering handles each have a connecting portion which runs in the direction of said transverse axis and is connected to the hub, and is connected to a radially outwardly arranged handle part which, in the usage position of the control yoke, extends upward inside a plane orthogonal to the rotation axis of the steering shaft and, in the standby position of the control yoke, extends towards a vehicle front.

3. The control yoke of claim 2, wherein the adjustment device has a guide tube which is connected rotationally fixedly to the steering shaft and is oriented along said transverse axis.

4. The control yoke of claim 3, wherein each connecting portion of the steering handles comprises a connecting tube which is guided so as to be displaceable relative to the guide tube.

5. The control yoke of claim 4, wherein each connecting tube and each respective connecting portion are formed of a one piece construction.

6. The control yoke of claim 4, wherein each respective connecting tube is displaceable relative to the guide tube by means of a spindle drive driven by an electric motor.

7. The control yoke of claim 6, wherein the electric motor is provided with two spindle drives for displacing both connecting tubes.

8. The control yoke of claim 6, wherein two electric motors are provided with two spindle drives for displacing the connecting tubes.

9. The control yoke of claim 8, wherein the two electric motors of the spindle drives are arranged in the guide tube, wherein spindles are arranged on motor shafts and are each oriented in the direction of each respective connecting tube, and wherein nuts sitting on the spindles are each connected directly or indirectly to a corresponding connecting tube.

10. The control yoke of claim 8, wherein the two electric motors of the spindle drives are each arranged in the connecting tube, wherein spindles are arranged on motor shafts and are each oriented in the direction of the guide tube, and wherein nuts sitting on the spindles are connected to the guide tube.

11. The control yoke of claim 7, wherein the electric motor is arranged in the guide tube, wherein a spindle is arranged on each axial side of a motor shaft and is oriented in a direction of the associated connecting tube, and wherein nuts sitting on the spindles are each directly or indirectly connected to the associated connecting tube, and wherein a first spindle of the spindles and its associated first nut have a right-hand thread, and a second spindle of the spindles and its associated second nut have a left-hand thread.

12. The control yoke of claim 8, wherein each connecting tube is mounted via a respective bearing so as to be rotatable about said transverse axis.

13. The control yoke of claim 12, wherein each bearing is attached to a housing element of the associated electric motor.

14. The control yoke of claim 12, wherein each connecting tube and/or guide tube each has a recess in at least one portion, into each of which a radially outwardly protruding bolt engages which is attached to the guide tube.

15. The control yoke of claim 12, wherein two end portions of the guide tube are each provided with at least one recess in at least one portion, into each of which a radially inwardly protruding bolt engages which is attached to the respective connecting tube.

16. The control yoke of claim 14, wherein each recess of the connecting tube or guide tube has an axially oriented end portion at both ends of its portion.

17. The control yoke of claim 15, wherein each recess of the connecting tube or guide tube has an axially oriented end portion at both ends of its portion.

* * * * *